United States Patent
Shafin et al.

(10) Patent No.: US 12,543,232 B2
(45) Date of Patent: Feb. 3, 2026

(54) EMLSR OPERATION FOR PEER-TO-PEER COMMUNICATION

(71) Applicant: Samsung Electronics Co., Ltd., Suwon-si (KR)

(72) Inventors: Rubayet Shafin, Allen, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 366 days.

(21) Appl. No.: 18/160,289

(22) Filed: Jan. 26, 2023

(65) Prior Publication Data

US 2024/0260106 A1    Aug. 1, 2024

Related U.S. Application Data

(60) Provisional application No. 63/304,395, filed on Jan. 28, 2022.

(51) Int. Cl.
*H04W 8/24* (2009.01)
*H04W 76/14* (2018.01)
*H04W 76/15* (2018.01)

(52) U.S. Cl.
CPC .............. *H04W 76/15* (2018.02); *H04W 8/24* (2013.01); *H04W 76/14* (2018.02)

(58) Field of Classification Search
CPC ........ H04W 76/14; H04W 76/15; H04W 8/24
See application file for complete search history.

(56) References Cited

U.S. PATENT DOCUMENTS

| | | |
|---|---|---|
| 2021/0007168 A1 | 1/2021 | Asterjadhi et al. |
| 2022/0029736 A1 | 1/2022 | Chu et al. |
| 2022/0418018 A1 | 12/2022 | Jang et al. |
| 2024/0196300 A1 | 6/2024 | Chu et al. |

FOREIGN PATENT DOCUMENTS

| | | |
|---|---|---|
| WO | 2021107685 A1 | 6/2021 |
| WO | 2021180541 A1 | 9/2021 |

OTHER PUBLICATIONS

Extended European Search Report issued Mar. 6, 2025 regarding Application No. 23747388.9, 9 pages.
Lorgeoux et al., "CC36 CR for EMLMR Links Sets", doc.: IEEE 802.11-22/0028r0, Jan. 2022, 7 pages.
International Search Report and Written Opinion issued May 1, 2023 regarding International Application No. PCT/KR2023/001276, 9 pages.

(Continued)

*Primary Examiner* — Sam Bhattacharya

(57) ABSTRACT

Methods and apparatuses for facilitating the use of enhanced multi-link single radio (EMLSR) operation for peer-to-peer (P2P) communications between peer multi-link devices (MLDs). A first non-access point (AP) MLD comprises first stations (STAs), each comprising a transceiver configured to form a P2P link with a corresponding second STA of a second non-AP MLD, and a processor. The processor is configured to generate a capability indication message that includes a capability indication that indicates that the first non-AP MLD is capable of EMLSR mode operation for P2P communication over the P2P links. At least one of the transceivers is further configured to transmit the capability indication message to the second non-AP MLD.

20 Claims, 8 Drawing Sheets

(56) References Cited

OTHER PUBLICATIONS

Seok et al., "PDT Hybrid EMLSR Mode", doc.: IEEE 802.11-21/1895r0, Dec. 2021, 4 pages.
IEEE P802.11be-D2.1 "Part 11: Wireless LAN Medium Access Control (MAC) and Physical Layer (PHY) Specifications, Amendment 8: Enhancements for extremely high throughput (EHT)" Jul. 2022, 885 pages.
IEEE P802.11be-D0.4 "Part 11: Wireless LAN Medium Access Control (MAC) and Physical Layer (PHY) Specifications—Amendment 8: Enhancements for extremely high throughput (EHT)" Mar. 2021, 511 pages.
European Patent Office, Communication under Rule 71(3) EPC issued Dec. 17, 2025 regarding Application No. 23747388.9, 50 pages.

| P2P EMLSR Support | P2P EMLSR Padding Delay | P2P EMLSR Transition Delay | P2P Transition Timeout | Reserved |
|---|---|---|---|---|
| Bits 1 | 3 | 3 | 4 | 5 |

FIG. 5

| P2P EMLSR Support | P2P EMLSR Padding Delay | P2P EMLSR Transition Delay | P2P Transition Timeout | EMLSR Initiating MLD | Reserved |
|---|---|---|---|---|---|
| Bits 1 | 3 | 3 | 4 | 1 | 4 |

FIG. 6

| Frame Control | Duration | RA | TA | Padding | FCS |
|---|---|---|---|---|---|
| Octets 2 | 2 | 6 | 6 | variable | 4 |

FIG. 7

| P2P EMLSR Support | P2P EMLSR Padding Delay | P2P EMLSR Transition Delay | P2P Transition Timeout | EMLSR Initiating MLD | Link Selecting MLD | Reserved |
|---|---|---|---|---|---|---|
| 1 | 3 | 3 | 4 | 1 | 1 | 3 |

Bits

EMLSR OPERATION FOR PEER-TO-PEER COMMUNICATION

CROSS-REFERENCE TO RELATED APPLICATION AND CLAIM OF PRIORITY

This application claims priority under 35 U.S.C. § 119(e) to U.S. Provisional Patent Application No. 63/304,395 filed on Jan. 28, 2022, which is hereby incorporated by reference in its entirety.

TECHNICAL FIELD

This disclosure relates generally to peer-to-peer communication in wireless communications systems that include multi-link devices. Embodiments of this disclosure relate to methods and apparatuses for facilitating the use of enhanced multi-link single-radio (EMLSR) operation for peer-to-peer communications between multi-link devices (MLD) in a wireless local area network (WLAN) communications system.

BACKGROUND

WLAN technology allows devices to access the internet in the 2.4 GHZ, 5 GHZ, 6 GHz, or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Next generation extremely high throughput (EHT) WI-FI systems, e.g., IEEE 802.11be, support multiple bands of operation, called links, over which an access point (AP) and a non-AP device can communicate with each other. Thus both the AP and non-AP device may be capable of communicating on different bands/links, which is referred to as multi-link operation (MLO). The WI-FI devices that support MLO are referred to as multi-link devices (MLDs). With MLO, it is possible for a non-access point (non-AP) MLD to discover, authenticate, associate, and set up multiple links with an AP MLD. Channel access and frame exchange is possible on each link that is set up between the AP MLD and non-AP MLD. For each link, a non-AP MLD indicates a set of supported maximum number of spatial streams (NSS) and modulation and coding schemes (MCS) in the "EHT-MCS Map" subfield of the "Supported EHT MCS and NSS Set" field of the EHT capabilities element. This is referred to as the link-specific "Basic MCS and NSS". The component of an MLD that is responsible for transmission and reception on one link is referred to as a station (STA).

The non-AP MLDs in 802.11be can have different capabilities in terms of multi-link operation. Many 802.11be non-AP MLDs may only have a single radio. Enhanced Multi-Link Single Radio (EMLSR) enables a multi-link operation with a single radio. With EMLSR operation, such a non-AP MLD can achieve throughput enhancement with reduced latency—a performance close to concurrent dual radio non-AP MLDs.

EMLSR mode may also be implemented on multi-radio MLDs to improve channel access capability with limited hardware cost and power consumption or to improve spectral efficiency. In EMLSR mode, a multi-radio non-AP device behaves like a single radio device that can perform channel sensing and reception of elementary packets on multiple bands/links simultaneously but can perform reliable data communication on only one link at a time. Thus, by opportunistically selecting a link for data communication where it wins the channel contention, EMLSR can improve system spectral efficiency.

SUMMARY

Embodiments of the present disclosure provide methods and apparatuses for facilitating the use of EMLSR operation for peer-to-peer (P2P) communications between MLDs in a WLAN.

In one embodiment, a first non-AP MLD is provided. The first non-AP MLD comprises first STAs, each comprising a transceiver configured to form a P2P link with a corresponding second STA of a second non-AP MLD, and a processor operably coupled to the first STAs. The processor is configured to generate a capability indication message that includes a capability indication that indicates that the first non-AP MLD is capable of EMLSR mode operation for P2P communication over the P2P links. At least one of the transceivers is further configured to transmit the capability indication message to the second non-AP MLD.

In another embodiment, a second non-AP MLD is provided. The second non-AP MLD comprises second STAs and a processor operably coupled to the second STAs. The second STAs each comprise a transceiver configured to form a P2P link with a corresponding first STA of a first non-AP MLD, and to receive a capability indication message from the first non-AP MLD. The processor is configured to determine that the capability indication message includes a capability indication that indicates that the first non-AP MLD is capable of EMLSR mode operation for P2P communication over the P2P links.

In another embodiment, a method of wireless communication is provided, performed by a first non-AP MLD that comprises first STAs that each comprise a transceiver configured to form a P2P link with a corresponding second STA of a second non-AP MLD. The method includes the steps of generating a capability indication message that includes a capability indication that indicates that the first non-AP MLD is capable of EMLSR mode operation for P2P communication over the P2P links, and transmitting the capability indication message to the second non-AP MLD.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 illustrates an example format of a P2P EMLSR Capabilities element according to embodiments of the present disclosure;

FIG. 6 illustrates an example format of a P2P EMLSR Capabilities element format including an EMLSR Initiating MLD subfield according to embodiments of the present disclosure;

FIG. 7 illustrates an example format of a P2P EMLSR-Start frame according to embodiments of the present disclosure;

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that EMLSR operation for P2P communication (for example, tunneled direct link setup (TDLS)) is not defined in current IEEE 802.11be specifications. Accordingly, while a non-AP MLD is communicating with its associated AP MLD and is operating in EMLSR mode, whether or not it is possible for the non-AP MLD to establish one or multiple peer-to-peer links with another peer non-AP MLD is not clear based on the latest IEEE 802.11be specification. Even if it is possible, there is no defined procedure for P2P setup while operating in the EMLSR mode.

Embodiments of the present disclosure further recognize that if two non-AP MLDs have already set up peer-to-peer links over one or multiple links between the two non-AP MLDs, there is no defined procedure for initiating (or activating) the EMLSR mode for P2P communications between the two non-AP MLDs. The operational procedure for EMLSR for P2P communication is also not defined in the current 802.11be specification.

Accordingly, embodiments of the present disclosure provide methods and apparatuses to facilitate enabling EMLSR operation for P2P communication.

Figure 1:
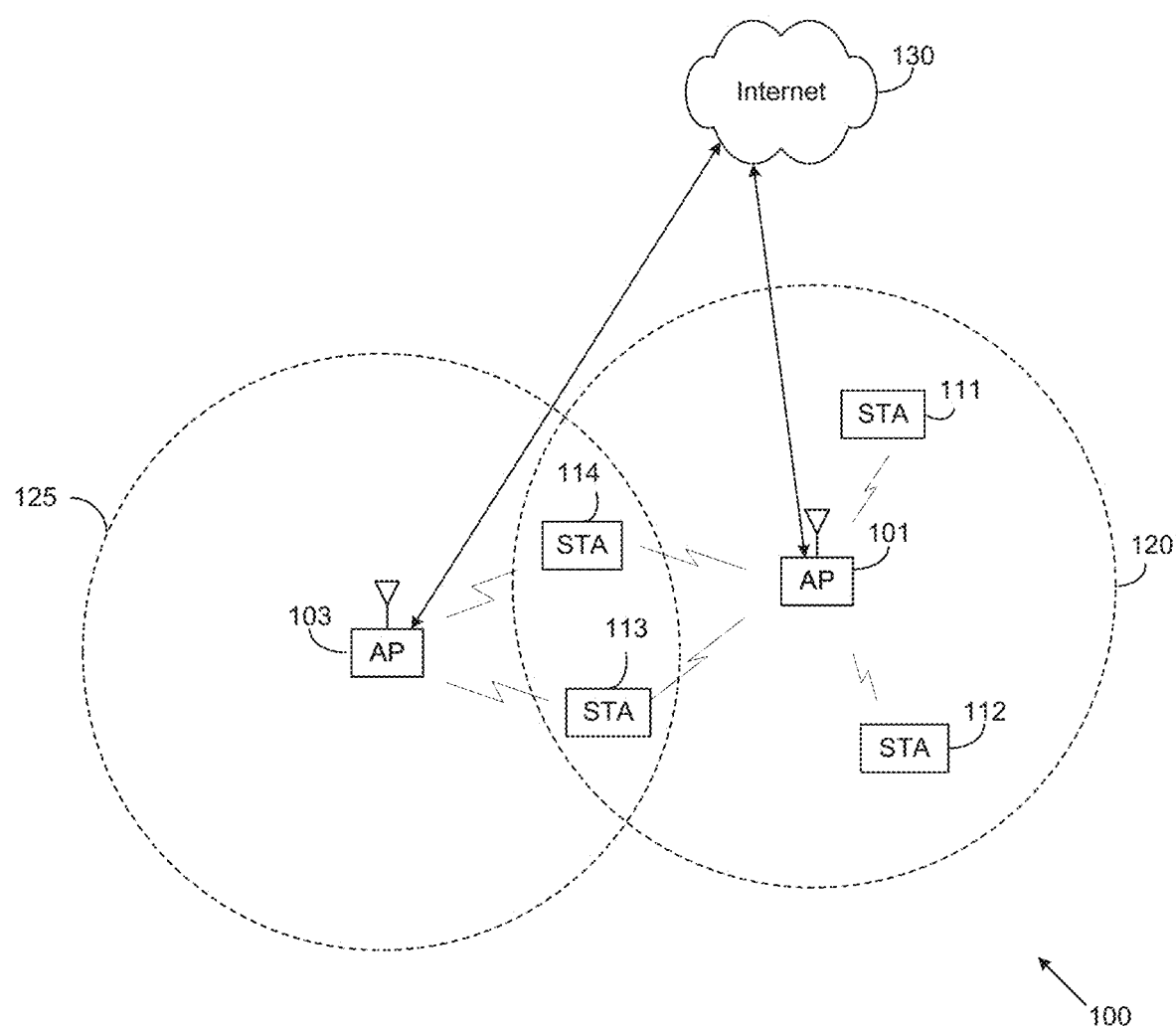
FIG. 1 illustrates an example wireless network according to various embodiments of the present disclosure.

FIG. 1 illustrates an example wireless network 100 according to various embodiments of the present disclosure.

The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating the use of EMLSR operation for P2P communications between MLDs in a WLAN. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
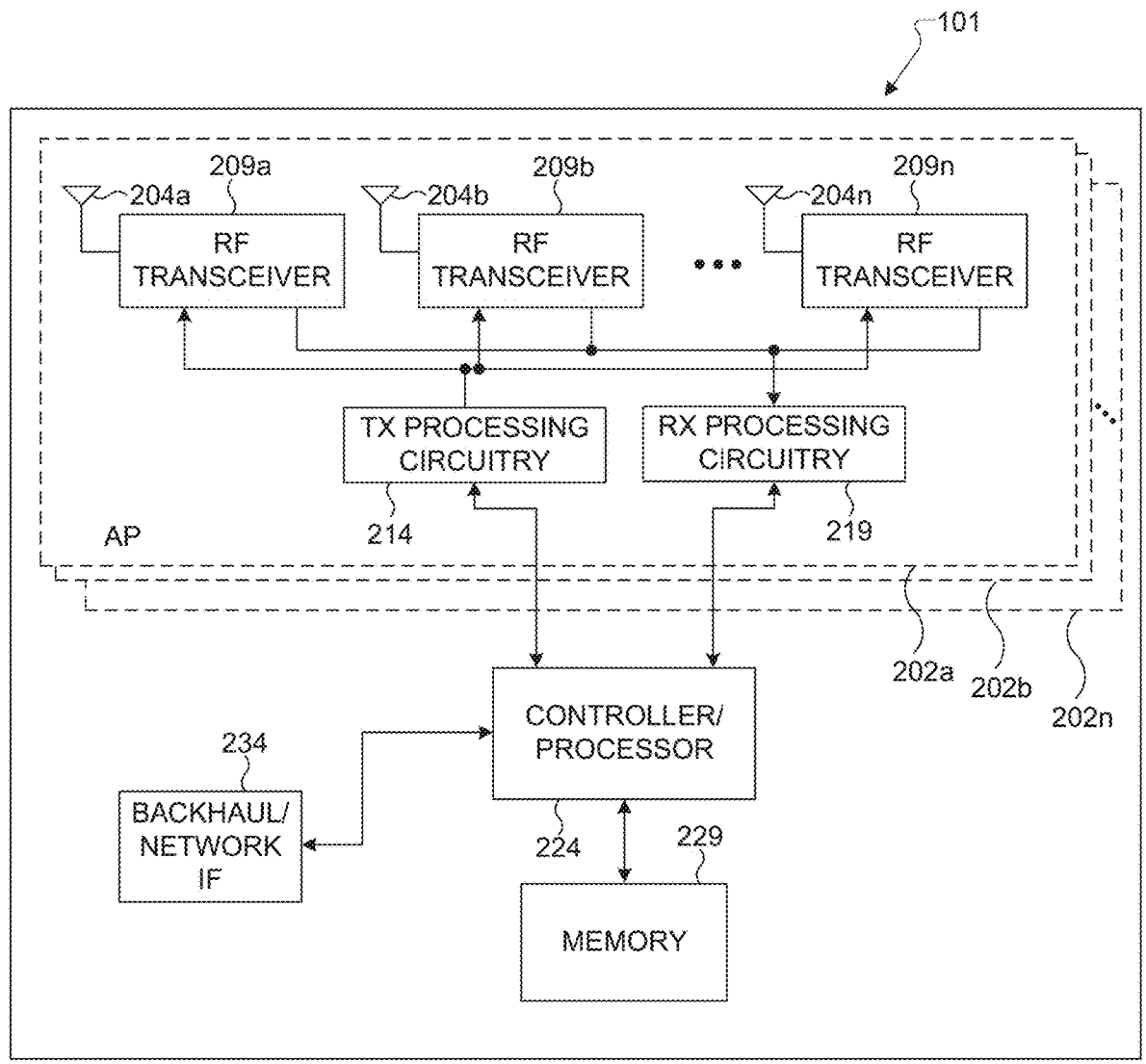
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn). Each of the affiliated APs 202a-202n includes multiple antennas 204a-204n, multiple RF transceivers 209a-209n, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth, e.g., 2.4 GHz, 5 GHZ, or 6 GHZ, and accordingly the incoming RF signals received by each affiliated AP may be at a different frequency of RF. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-convert the baseband or IF signals to RF signals that are transmitted via the antennas 204a-204n. In embodiments wherein each affiliated AP 202a-202n operates at a different bandwidth, e.g., 2.4 GHz, 5 GHZ, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including facilitating the use of EMLSR operation for P2P communications between MLDs in a WLAN. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for facilitating the use of EMLSR operation for P2P communications between MLDs in a WLAN. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202a-202n is shown as including a single instance of TX processing circuitry 214 and a single instance of RX processing circuitry 219, the AP MLD 101 could include multiple instances of each (such as one per RF transceiver) in one or more of the affiliated APs 202a-202n. Alternatively, only one antenna and RF transceiver path may be included in one or more of the affiliated APs 202a-202n, such as in legacy APs. Also, various components in FIG. 2A could be combined, further subdivided, or omitted and additional components could be added according to particular needs.

Figure 2B:
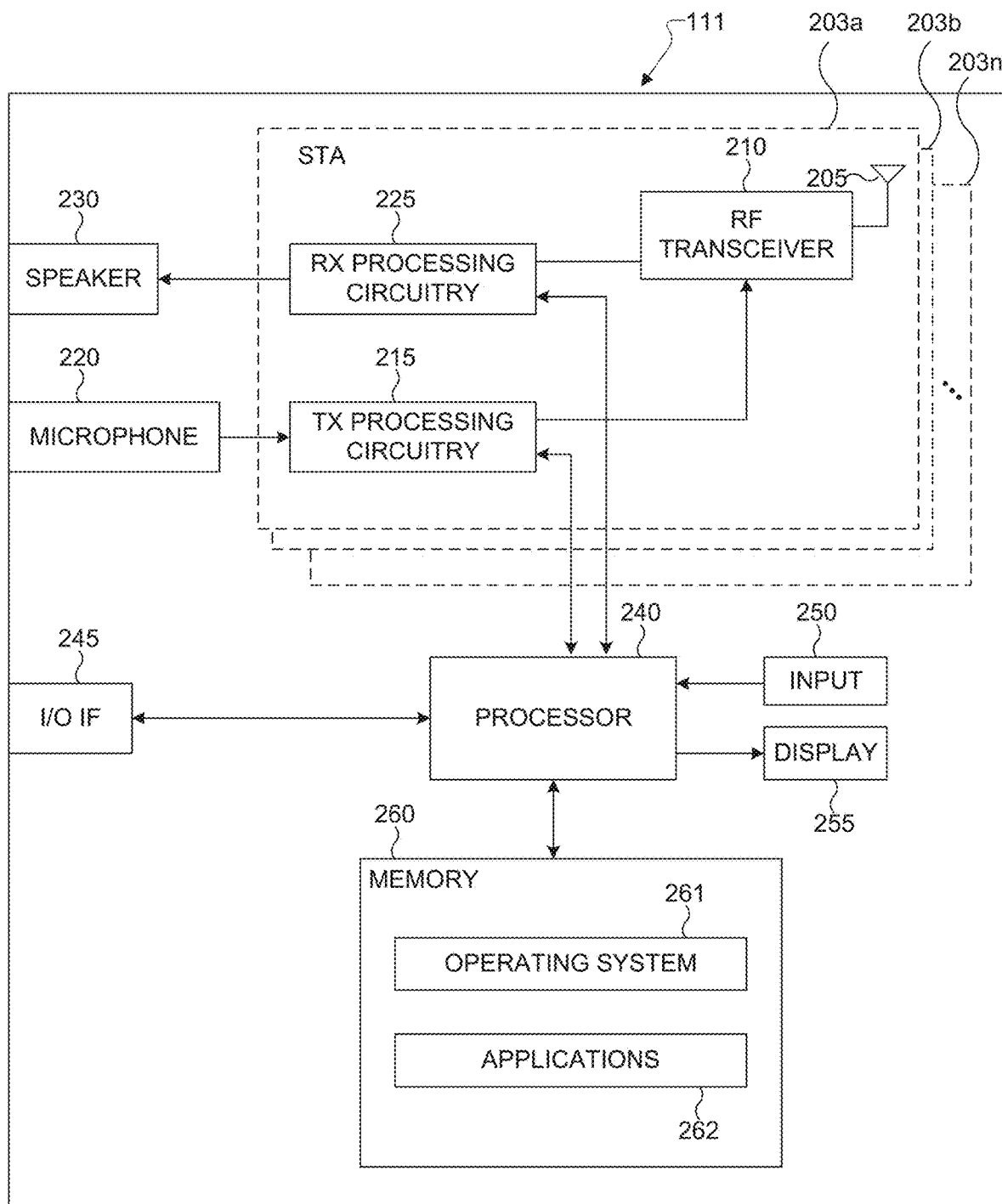
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203a-203n (which may be referred to, for example, as STA1-STAn). Each of the affiliated STAs 203a-203n includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203a-203n may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203a-203n.

For each affiliated STA 203a-203n, the RF transceiver 210 receives, from the antenna(s) 205, an incoming RF signal transmitted by an AP of the network 100. In some embodiments, each affiliated STA 203a-203n operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203a-203n, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203a-203n operates at a different bandwidth, e.g., 2.4 GHz, 5 GHz, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to facilitate the use of EMLSR operation for P2P communications between MLDs in a WLAN. In some embodiments, the controller/processor 240 includes at least one microprocessor or microcontroller.

The controller/processor 240 is also capable of executing other processes and programs resident in the memory 260, such as operations for facilitating the use of EMLSR operation for P2P communications between MLDs in a WLAN. The controller/processor 240 can move data into or out of the memory 260 as required by an executing process. In some embodiments, the controller/processor 240 is configured to execute a plurality of applications 262, such as applications for facilitating the use of EMLSR operation for P2P communications between MLDs in a WLAN. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203a-203n may include any number of antenna(s) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

The operating procedure for EMLSR links the behavior of STAs affiliated with a non-AP MLD during EMLSR operation are defined in the 802.11be standards. According to current specifications, if a non-AP MLD intends to operate in EMLSR mode with its associated AP MLD, then a STA affiliated with the non-AP MLD sends an EML Operating Mode Notification frame to its associated AP affiliated with the AP MLD with an EMLSR Mode subfield in the EML Control field in the EML Operating Mode Notification frame set to 1. Upon receiving the EML Operating Mode Notification frame from the non-AP MLD, the AP MLD can send, on any enabled link between the AP MLD and the non-AP MLD, another EML Operating Mode Notification frame with the EMLSR Mode subfield in the EML Control field in the EML Operating Mode Notification frame set to 1.

The AP affiliated with the AP MLD is expected to send the EML Operating Mode Notification frame in response to the EML Operating Mode Notification frame sent by the STA affiliated with the non-AP MLD within the timeout interval indicated in the Transition Timeout subfield in the EML Capabilities subfield in the Basic Variant Multi-Link element that is most recently exchanged between the AP MLD and the non-AP MLD. The non-AP MLD transitions to EMLSR mode immediately after receiving the EML Operating Mode Notification frame with EMLSR Mode subfield in the EML Control field set to 1 from an AP affiliated with the AP MLD, or immediately after the timeout interval indicated in the Transition Timeout subfield in EML Capabilities field in the Basic Variant Multi-Link element elapses after the end of last PPDU contained in the EML Operating Mode Notification frame transmitted by the non-AP MLD, whichever occurs first. Upon transitioning into the EMLSR mode of operation, all STAs affiliated with the non-AP MLD transition to active mode (listening mode).

Figure 3:
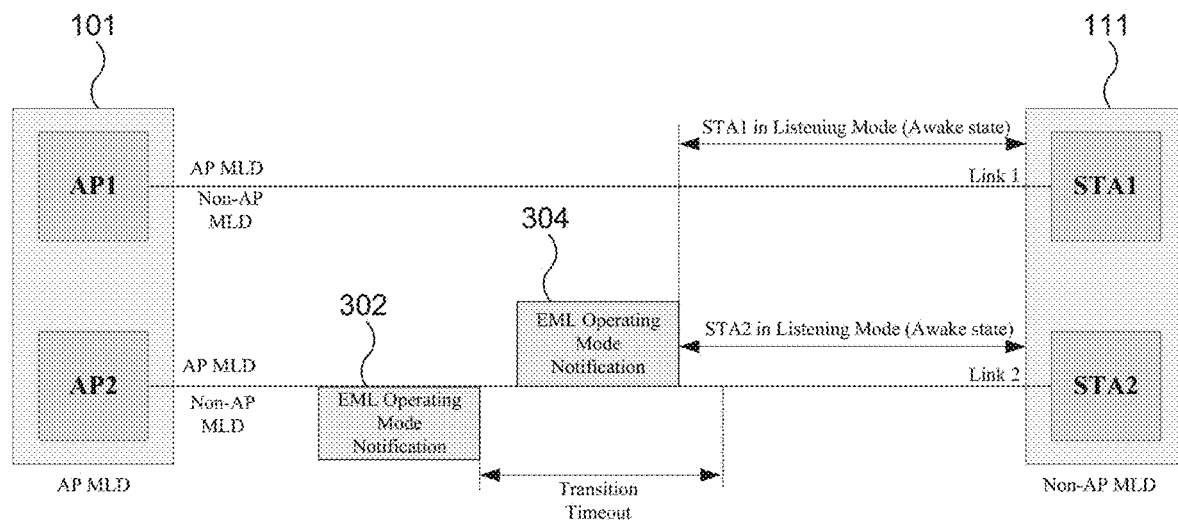
FIG. 3 illustrates an example process for transitioning into EMLSR operation according to embodiments of the present disclosure.

FIG. 3 illustrates an example process for transitioning into EMLSR operation according to embodiments of the present disclosure. In this example, the AP MLD may be an AP MLD 101, and the non-AP MLD may be a non-AP MLD 111. Although the AP MLD 101 is illustrated with two affiliated APs (AP1 and AP2) and the non-AP MLD 111 is illustrated as a single radio non-AP MLD with two affiliated non-AP STAs (STA1 and STA2), it is understood that this process could be applied with suitable MLDs having any number of affiliated APs or STAs. For ease of explanation, it is understood that references to an AP MLD and a non-AP MLD in further embodiments below refer to the AP MLD 101 and non-AP MLD 111, respectively.

In the example of FIG. 3, two links are set up between the AP MLD and the non-AP MLD: Link 1 between AP1 and STA1, and Link 2 between AP2 and STA2. In this example both Link 1 and Link 2 are enabled links. The non-AP MLD intends to transition to EMLSR mode, and accordingly STA2 sends to AP2 over Link 2 an EML Operating Mode Notification frame 302 with EMLSR Mode subfield in EML Control field set to 1. In response to the EML Operating Mode Notification frame 302 transmitted by the non-AP MLD, AP2 sends to STA2 another EML Operating Mode Notification frame 304 with EMLSR Mode subfield in EML Control field set to 1. After receiving the EML Operating Mode Notification frame 304 from the AP MLD, the non-AP MLD transitions into EMLSR mode, and both STA1 and STA2 transition into listening mode.

As discussed above, procedures for EMLSR operation for P2P communications between peer non-AP MLDs are not currently defined. Accordingly, various embodiments of the present disclosure provided herein below facilitate P2P EMLSR operations for non-AP MLDs.

According to one embodiment, when there are multiple TDLS links (or other P2P links) set up between two non-AP MLDs, either one of the non-AP MLDs (e.g., a first non-AP MLD) can indicate its intention to transition into EMLSR mode for P2P communication to its peer non-AP MLD (e.g., a second non-AP MLD) by sending an EML Operating Mode Notification frame with the EMLSR Mode subfield in the EML Control field set to 1 to the peer non-AP MLD over any of the TDLS links (or other P2P links) established between the two peer non-AP MLDs.

Upon receiving the EML Operating Mode Notification frame, the peer non-AP MLD (the second non-AP MLD) should respond by sending another EML Operating Mode Notification frame with the EMLSR Mode subfield in the EML Control field set to 1 within the timeout interval (as indicated in the Transition Timeout subfield in the EML Capabilities subfield in the Common Info field of the Basic Multi-link element) starting at the end of the PPDU transmitted by the peer non-AP MLD (second non-AP MLD) over any of the set up peer-to-peer links between the two non-AP MLDs as an acknowledgement to the EML Operating Mode Notification frame transmitted by the first non-AP MLD over any of the set up peer-to-peer links between the two non-AP MLDs. Immediately after sending this response frame, both peer non-AP MLDs will transition into EMLSR mode for peer-to-peer communication and all the EMLSR links that are also peer-to-peer links shall transition into listening mode.

Figure 4:
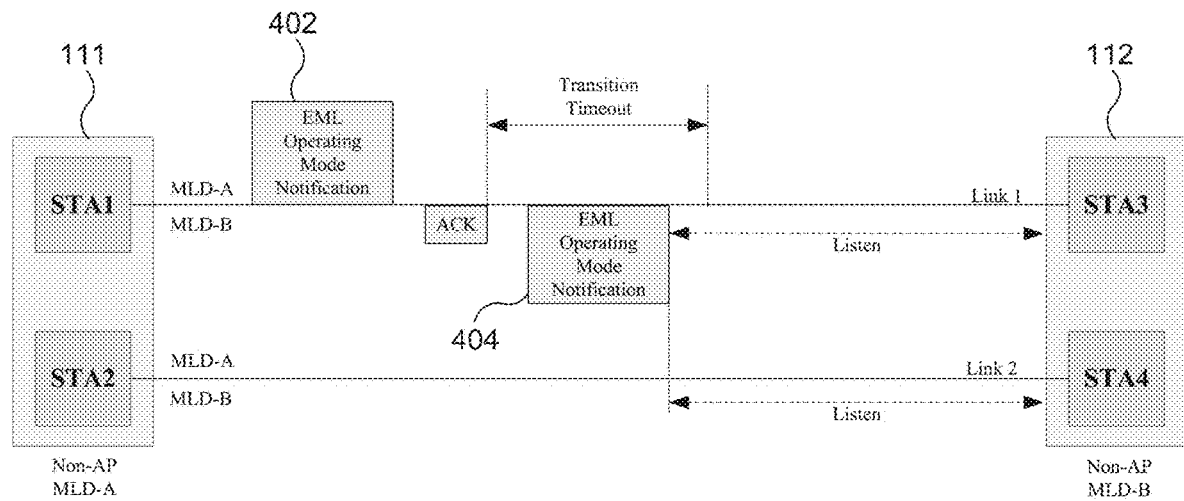
FIG. 4 illustrates an example of use of an EML Operating Mode Notification frame for transitioning into EMLSR mode for P2P communication according to embodiments of the present disclosure.

FIG. 4 illustrates an example of use of an EML Operating Mode Notification frame for transitioning into EMLSR mode for P2P communication according to embodiments of the present disclosure. In this example, the first peer non-AP MLD (non-AP MLD-A) may be a non-AP MLD 111 and the second peer non-AP MLD (non-AP MLD-B) may be a non-AP MLD 112. Although the non-AP MLD 111 is illustrated as a single radio non-AP MLD with two affiliated non-AP STAs (STA1 and STA2) and the non-AP MLD 112 is illustrated as a single radio non-AP MLD with two affiliated non-AP STAs (STA3 and STA4), it is understood that this process could be applied with suitable MLDs having any number of affiliated STAs. For ease of explanation, it is understood that references to first and second non-AP MLDs in further embodiments below refer to the non-AP MLDs 111 and 112, respectively.

In the example of FIG. 4, STA1 and STA2 are two non-AP STAs affiliated with non-AP MLD-A. STA3 and STA4 are two non-AP STAs affiliated with non-AP MLD-B. STA1 and STA3 are associated with AP1 affiliated with an AP MLD, AP MLD-1 (not shown in the figure). STA2 and STA4 are associated with AP2 affiliated with AP MLD-1. There are two TDLS links (or other peer-to-peer links) set up between non-AP MLD-A and non-AP MLD-B: Link 1 between STA1 and STA3, and Link 2 between STA2 and STA4. While operating over the peer-to-peer Link 1, STA1 sends an EML Operating Mode Notification frame 402 to STA3 in order to indicate non-AP MLD-A's intention to transition into EMLSR mode for peer-to-peer communication. Within the timeout interval indicated by the Transition Timeout subfield in the EML Capabilities subfield in the Common Info field of the Basic Multi-Link element, STA3 responds to the EML Operating Mode Notification frame 402 received from STA1 by sending another EML Operating Mode Notification frame 404 to STA1 over the peer-to-peer Link 1. Upon transmission of the EML Operating Mode Notification frame 404 from STA3, non-AP MLD-A and non-AP MLD-B both transition into EMLSR mode for peer-to-peer communication.

In order to be able to perform EMLSR operation on TDLS links between two TDLS peer non-AP MLDs, both TDLS peer non-AP MLDs need to support EMLSR operation. For EMLSR operation between an AP MLD and a non-AP MLD, the capability of the MLDs to support EMLSR operation is indicated in the EMLSR Support subfield in the EML Capabilities subfield in the Common Info field of a Multi-link element. Similarly, when a TDLS non-AP MLD intends to operate in EMLSR mode with another TDLS peer non-AP MLD over the TDLS links, both peer non-AP MLDs need to be made aware of each other's EMLSR capabilities. Accordingly, transmission of a Multi-Link element or another element that can convey the EMLSR capability information may be incorporated with the TDLS discovery/setup process in order to indicate the EMLSR capabilities of the TDLS peer non-AP MLDs.

According to one embodiment, the TDLS Discovery Response Action frame contains the Multi-link element. An example format of this embodiment of the TDLS Discovery Response Action frame is shown in Table 1. Inclusion of the Basic Multi-Link element in the TDLS Discovery frame transmitted by a non-AP MLD would be a medium to convey its EMLSR capability for P2P communication to its peer non-AP MLD.

TABLE 1

| Order | Information | Notes |
|---|---|---|
| <Last assigned + 1> | EHT Capabilities | The EHT Capabilities element is present if dot11EHTOption-Implemented is true; otherwise it is not present. |

TABLE 1-continued

| Order | Information | Notes |
|---|---|---|
| <Last assigned + 2> | Multi-Link | The Basic Multi-Link element is present if the STA transmitting the TDLS Discovery Response frame is affiliated with an MLD. Otherwise, it is not present. |

According to another embodiment, in order to indicate the support for the EMLSR operation the TDLS Discovery Response Action frame can include a P2P EMLSR Capabilities element. An example alternative format (with less overhead than the Multi-Link element based previous embodiment) of the TDLS Discovery Response Action frame for this embodiment is shown in Table 2.

TABLE 2

| Order | Information | Notes |
|---|---|---|
| <Last assigned + 1> | EHT Capabilities | The EHT Capabilities element is present if dot11EHTOption-Implemented is true; otherwise it is not present. |
| <Last assigned + 2> | P2P EMLSR Capabilities | The P2P EMLSR Capabilities element is present if the STA transmitting the TDLS Discovery Response frame is affiliated with an MLD and the MLD sets the dot11EMLSROptionImplemented equal to true. Otherwise, the P2P EMLSR Capabilities element is not present. |

FIG. 5 illustrates an example format of a P2P EMLSR Capabilities element according to embodiments of the present disclosure. The P2P EMLSR Support subfield indicates that a non-AP MLD supports the EMLSR mode of operation over TDLS direct links or other P2P direct links with another peer non-AP MLD. The EMLSR Support subfield is set to 1 if the non-AP MLD supports the EMLSR operation during TDLS or other peer-to-peer communication with another peer non-AP MLD. Otherwise it is set to 0.

The P2P EMLSR Padding Delay subfield indicates the minimum MAC padding duration of the Padding field of the initial Control frame requested by the non-AP MLD that transmits the element for EMLSR operation over TDLS direct links or other P2P direct links with another peer non-AP MLD. An example encoding for the P2P EMLSR Padding Delay subfield value is defined in Table 3. Other alternative encodings for this subfield are also possible.

TABLE 3

| P2P EMLSR Padding Delay subfield value | EMLSR padding delay for P2P operation |
|---|---|
| 0 | 0 µs |
| 1 | 16 µs |
| 2 | 32 µs |
| 3 | 64 µs |
| 4 | 128 µs |
| 5 | 256 µs |
| 6-7 | Reserved |

The P2P EMLSR Transition Delay subfield indicates the transition delay time needed by a peer non-AP MLD to switch from exchanging frames on one of the TDLS links to the listening operation on all of the TDLS links established between the two peer non-AP MLDs. The P2P EMLSR Transition Delay subfield is 3 bits and an example encoding of this field is shown in Table 4.

TABLE 4

| P2P EMLSR Transition Delay subfield value | EMLSR transition delay for P2P operation |
|---|---|
| 0 | 0 µs |
| 1 | 16 µs |
| 2 | 32 µs |
| 3 | 64 µs |
| 4 | 128 µs |
| 5 | 256 µs |
| 6-7 | Reserved |

The P2P Transition Timeout subfield indicates the timeout value for EML Operating Mode Notification frame exchange in EMLSR mode during TDLS communication between two peer non-AP MLDs. The P2P Transition Timeout subfield is 4 bits long and an example encoding for the value in this field is shown in Table 5.

TABLE 5

| P2P Transition Timeout subfield value | Transition timeout for P2P communication |
|---|---|
| 0 | 0 TUs |
| 1 | 128 µs |
| 2 | 256 µs |
| 3 | 512 µs |
| 4 | 1 TU |
| 2 | 2 TUs |
| 3 | 4 TUs |
| 4 | 8 TUs |
| 5 | 16 TUs |
| 6 | 32 TUs |
| 70 | 64 TUs |
| 8 | 128 TUs |
| 9-15 | Reserved |

According to one embodiment, the TDLS Setup Request Action frame contains the Multi-link element. An example format of the TDLS Setup Request Action frame is shown in Table 6. Inclusion of the Basic Multi-Link element in the TDLS Setup Request frame transmitted by a non-AP MLD would be a medium to convey its EMLSR capability for P2P communication to its peer non-AP MLD.

TABLE 6

| Order | Information | Notes |
|---|---|---|
| 19 | AID | The AID element containing the AID of the STA or non-AP MLD whose affiliated STA is sending the frame is present if dot11VHTOptionImplemented, dot11HEOptionImplemented, dot11EHTOptionImplemented or dot11S1GOption-Implemented is true. |
| <Last assigned + 1> | EHT Capabilities | The EHT Capabilities element is present if dot11EHTOption-Implemented is true; otherwise it is not present. |
| <Last assigned + 2> | Multi-Link | The Basic Multi-Link element is present if the STA transmitting the TDLS Setup Request frame is affiliated with an MLD. Otherwise, it is not present. |

According to another embodiment, in order to indicate that the non-AP MLD can support EMLSR operation during P2P communication, the TDLS Setup Request Action frame can include a P2P EMLSR Capabilities element. An example alternative format (with less overhead than the Multi-Link element based previous embodiment) of the TDLS Setup Request Action frame for this embodiment is shown in Table 7.

TABLE 7

| Order | Information | Notes |
|---|---|---|
| 19 | AID | The AID element containing the AID of the STA or non-AP MLD whose affiliated STA is sending the frame is present if dot11VHTOptionImplemented, dot11HEOptionImplemented, dot11EHTOptionImplemented or dot11S1GOption-Implemented is true. |
| <Last assigned + 1> | EHT Capabilities | The EHT Capabilities element is present if dot11EHTOption-Implemented is true; otherwise it is not present. |
| <Last assigned + 2> | P2P EMLSR Capabilities | The P2P EMLSR Capabilities element is present if the STA transmitting the TDLS Setup Request frame is affiliated with an MLD and the MLD sets the dot11EMLSROptionImplemented equal to true. Otherwise, the P2P EMLSR Capabilities element is not present. |

According to one embodiment, the TDLS Setup Response Action frame contains the Multi-link element. An example format of the TDLS Setup Response Action frame is shown in Table 8. Inclusion of the Basic Multi-Link element in the TDLS Setup Response frame transmitted by a non-AP MLD would be a medium to convey its EMLSR capability for P2P communication to its peer non-AP MLD.

TABLE 8

| Order | Information | Notes |
|---|---|---|
| 20 | AID | The AID element containing the AID of the STA or non-AP MLD whose affiliated STA is sending the frame is present if dot11VHTOptionImplemented, dot11HEOptionImplemented, dot11EHTOptionImplemented or dot11S1GOption-Implemented is true and the Status Code is SUCCESS and not present otherwise. |
| <Last assigned + 1> | EHT Capabilities | The EHT Capabilities element is present if dot11EHTOption-Implemented is true; otherwise it is not present. |
| <Last assigned + 2> | Multi-Link | The Basic Multi-Link element is present if the STA transmitting the TDLS Setup Response frame is affiliated with an MLD. Otherwise, it is not present. |

According to another embodiment, in order to indicate that the non-AP MLD can support EMLSR operation during P2P communication, the TDLS Setup Response Action frame can include a P2P EMLSR Capabilities element. An example alternative format (with less overhead than the Multi-Link element based previous embodiment) of the TDLS Setup Response Action frame for this embodiment is shown in Table 9.

TABLE 9

| Order | Information | Notes |
|---|---|---|
| 20 | AID | The AID element containing the AID of the STA or non-AP MLD whose affiliated STA is sending the frame is present if dot11VHTOptionImplemented, dot11HEOptionImplemented, dot11EHTOptionImplemented or dot11S1GOption-Implemented is true and the |

TABLE 9-continued

| Order | Information | Notes |
|---|---|---|
| | | Status Code is SUCCESS and not present otherwise. |
| <Last assigned + 1> | EHT Capabilities | The EHT Capabilities element is present if dot11EHTOption-Implemented is true; otherwise it is not present. |
| <Last assigned + 2> | P2P EMLSR Capabilities | The P2P EMLSR Capabilities element is present if the STA transmitting the TDLS Setup Response frame is affiliated with an MLD and the MLD sets the dot11EMLSROptionImplemented equal to true. Otherwise, the P2P EMLSR Capabilities element is not present. |

According to one embodiment, the TDLS Setup Confirm Action frame contains the Multi-link element. An example format of the TDLS Setup Confirm Action frame is shown in Table 10. Inclusion of the Basic Multi-Link element in the TDLS Setup Confirm frame transmitted by a non-AP MLD would be a medium to convey its EMLSR capability for P2P communication to its peer non-AP MLD.

TABLE 10

| Order | Information | Notes |
|---|---|---|
| <Last assigned + 1> | EHT Operation | The EHT Operation element is present when dot11EHTOption-Implemented is true, the TDLS Setup Response frame contained an EHT Capabilities element, and the Status Code is SUCCESS; otherwise it is not present. The EHT Operation element is defined in 9.4.2.311 (EHT Operation element). |
| <Last assigned + 2> | Multi-Link | The Basic Multi-Link element is present if the STA transmitting the TDLS Setup Confirm frame is affiliated with an MLD. Otherwise, it is not present. |

According to another embodiment, in order to indicate that the non-AP MLD can support EMLSR operation during P2P communication, the TDLS Setup Confirm Action frame can include a P2P EMLSR Capabilities element. An example alternative format (with less overhead than the Multi-Link element based previous embodiment) of the TDLS Setup Response Action frame for this embodiment is shown in Table 11.

TABLE 11

| Order | Information | Notes |
|---|---|---|
| <Last assigned + 1> | EHT Operation | The EHT Operation element is present when dot11EHTOption-Implemented is true, the TDLS Setup Response frame contained an EHT Capabilities element, and the Status Code is SUCCESS; otherwise it is not present. The EHT Operation element is defined in 9.4.2.311 (EHT Operation element). |
| <Last assigned + 2> | P2P EMLSR Capabilities | The P2P EMLSR Capabilities element is present if the STA transmitting the TDLS Setup Confirm frame is affiliated with an MLD and the MLD sets the dot11EMLSROptionImplemented equal to true. Otherwise, the P2P EMLSR Capabilities element is not present. |

According to one embodiment, when there are multiple TDLS links (or other P2P links) set up between two non-AP MLDs that support EMLSR operation over the TDLS direct links, only one of the two non-AP MLDs (e.g., the first non-AP MLD) can indicate its intention to transition into EMLSR mode for P2P communication to its peer non-AP MLD (e.g., the second non-AP MLD) by sending an EML Operating Mode Notification frame with the EMLSR Mode subfield in the EML Control field set to 1 to the peer non-AP MLD over any of the TDLS links (or other P2P links) established between the two peer non-AP MLDs. Which of the two non-AP MLDs is allowed to make such an indication to transition into EMLSR mode or transition out of EMLSR mode (e.g., by sending an EML Operating Mode Notification frame with the EMLSR Mode subfield in the EML Control field set to 0 to the peer non-AP MLD over any of the TDLS links or other P2P links established between the two peer non-AP MLDs) is based on the relative capabilities of the two peer non-AP MLDs. For example, if one non-AP MLDs is STR (simultaneous transmit and receive) capable and the other peer non-AP MLD is NSTR (non-simultaneous transmit and receive) constrained, then the non-AP MLD with STR capability will be the one that can indicate to transition into or transition out of EMLSR mode to its peer non-AP MLD. This would be an implicit signaling between the two non-AP MLDs supporting EMLSR mode for P2P communication.

According to another embodiment, when there are multiple TDLS links (or other P2P links) set up between two non-AP MLDs that support EMLSR operation over the TDLS direct links, which of the two non-AP MLDs can initiate the process of transitioning into EMLSR mode or transitioning out of EMLSR mode for P2P communication is indicated in the P2P EMLSR Capabilities elements that are exchanged between the two peer non-AP MLDs during the TDLS discovery and setup process. In order to accommodate this signaling the P2P EMLSR Capabilities element may include an additional subfield for indicating which of the MLDs can make the transition into or out of EMLSR mode for P2P communication.

FIG. 6 illustrates an example format of a P2P EMLSR Capabilities element format including an EMLSR Initiating MLD subfield according to embodiments of the present disclosure. In the example of FIG. 6, the definitions of the P2P EMLSR Support subfield, P2P EMLSR Padding Delay subfield, P2P EMLSR Transition Delay subfield, and P2P Transition Timeout subfield in the P2P EMLSR Capabilities element may be the same as the definitions of the corresponding subfields of FIG. 5.

The EMLSR Initiating MLD subfield in the P2P EMLSR Capabilities element indicates whether or not the peer non-AP MLD transmitting the element intends to be the initiator MLD for transitioning into or transitioning out of the EMLSR mode. If the EMLSR Initiating MLD subfield is set to 1 by the non-AP MLD that transmits the corresponding P2P EMLSR Capabilities element, it indicates that the non-AP MLD intends to be the EMLSR initiating MLD. Otherwise, the transmitting non-AP MLD will not be the EMLSR initiating MLD.

According to one embodiment, if the EMLSR Initiating MLD subfield in the P2P EMLSR Capabilities element contained in a TDLS Discovery Request frame or TDLS Setup Request frame is set to 1, the peer non-AP MLD for which the TDLS Discovery Request frame or TDLS Setup Request frame is intended should not also set the EMLSR Initiating MLD subfield to 1 in the P2P EMLSR Capabilities element contained in the corresponding TDLS Discovery Response frame or TDLS Setup Response frame.

According to another embodiment, if the EMLSR Initiating MLD subfield in the P2P EMLSR Capabilities element contained in a TDLS Discovery Request frame or TDLS Setup Request frame is set to 0, the peer non-AP MLD for which the TDLS Discovery Request frame or TDLS Setup Request frame is intended should not also set the EMLSR Initiating MLD subfield to 0 in the P2P EMLSR Capabilities element contained in the corresponding TDLS Discovery Response frame or TDLS Setup Response frame.

According to yet another embodiment, if the EMLSR Initiating MLD subfield in the P2P EMLSR Capabilities element is set to the same value in the TDLS Discovery Request frame or TDLS Setup Request frame and in the corresponding TDLS Discovery Response frame or TDLS Setup Response frame, then it indicates that either of the two peer non-AP MLDs can initiate the process of transitioning into and transitioning out of EMLSR mode for peer-to-peer communication. According to another embodiment, if the EMLSR Initiating MLD subfield in the P2P EMLSR Capabilities element is set to the same value in the TDLS Discovery Request frame or TDLS Setup Request frame and in the corresponding TDLS Discovery Response frame or TDLS Setup Response frame, then the TDLS setup process is not successful—the TDLS respondent non-AP MLD will send the TDLS Setup Response frame to the TDLS initiator non-AP MLD with the Status Code not equal to SUCCESS, and the TDLS initiator non-AP MLD, upon receipt of the TDLS Setup Response frame with Status Code not equal to SUCCESS, will terminate the TDLS setup procedure and will discard the TDLS Setup Response frame.

According to one embodiment, when there are multiple TDLS links (or other P2P links) set up between two non-AP MLDs, one non-AP MLD supporting EMLSR operation shall not initiate the process of transitioning into EMLSR mode for peer-to-peer communication if its peer non-AP MLD does not support EMLSR operation for peer-to-peer communication.

According to one embodiment, when there are multiple TDLS links (or other P2P links) set up between two non-AP MLDs supporting EMLSR operation over TDLS direct links and either of the two peer non-AP MLDs can be the initiator of the process of transitioning into EMLSR mode, in order to reduce the probability that both peer non-AP MLDs transmit the EML Operating Mode Notification frame as a request for transitioning into EMLSR mode over TDLS direct links at more or less the same time (there is at least one random back-off between the two frames being transmitted), a TDLS peer non-AP MLD (e.g., the first peer non-AP MLD) should not transmit an EML Operating Mode Notification frame as an EMLSR transitioning request if the first peer non-AP MLD has received another EML Operating Mode Notification frame as an EMLSR transitioning request from its peer non-AP MLD (e.g., the second peer non-AP MLD) and the first peer non-AP MLD has not transmitted an EML Operating Mode Notification frame as a response to the second peer non-AP MLD's request to transition into EMLSR mode.

Once two TDLS peer non-AP MLDs supporting EMLSR operation transition into EMLSR mode for peer-to-peer communication, a link on which the EMLSR frame exchange will happen should be selected. According to one embodiment, either of the two TDLS peer non-AP MLDs can send a specific frame—the P2P EMLSR-Start frame—to its peer non-AP MLD, which indicates the chosen link for the P2P EMLSR frame exchange. Upon reception of the P2P EMLSR-Start frame, the peer non-AP MLD should issue an Ack frame as a response.

FIG. 7 illustrates an example format of a P2P EMLSR-Start frame according to embodiments of the present disclosure. In the example of FIG. 7, the P2P EMLSR-Start frame does not contain any link indication bitmap. Instead, the subsequent P2P EMLSR frame exchange (PPDU transmission) will take place on the link between the two peer non-AP MLDs on which this control frame is transmitted. Therefore, no further link indication be needed. As a result, the P2P EMLSR-Start frame acts as an EMLSR initial control frame for P2P communication in a manner analogous to that of the EMLSR initial control frame currently used for EMLSR operation between an AP MLD and a non-AP MLD.

In the example of FIG. 7, the format of the Frame Control field may be the same as that provided in the current specification for any Control frame. According to one embodiment, a Type subfield (B3 B2) and a Subtype subfield (B7 B6 B5 B4) of the Frame Control field of the P2P EMLSR-Start frame are set as 01 and 1111, respectively. Accordingly, example valid combinations of the Type subfield and Subtype subfield are shown in Table 12. Other possible combinations for the Type and Subtype subfields are <Type value=01, Subtype value=0000> and <Type value=01, Subtype value=0001>.

TABLE 12

| Type value B3 B2 | Type description | Subtype value B7 B6 B5 B4 | Subtype description |
|---|---|---|---|
| . | . | . | . |
| . | . | . | . |
| . | . | . | . |
| 01 | Control | 1101 | Ack |
| 01 | Control | 1110 | CF-End |
| 01 | Control | 1111 | P2P EMLSR-Start |
| 10 | Data | 0000 | Data |
| . | . | . | . |
| . | . | . | . |
| . | . | . | . |

In the example of FIG. 7, the definitions of the Duration field, RA field, TA field, and FCS field may be the same as the definitions in the current specification. The Padding field is optionally present in the P2P EMLSR-Start frame to extend the frame length in order to give the recipient of the frame enough time to prepare a response for transmission a short inter-frame spacing (SIFS) after the P2P EMLSR-Start frame is received. The Padding field, if present, is at least two octets in length. According to one embodiment the Padding and is set to all 1s, and according to another embodiment it is set to all 0s.

Figures 8, 9:
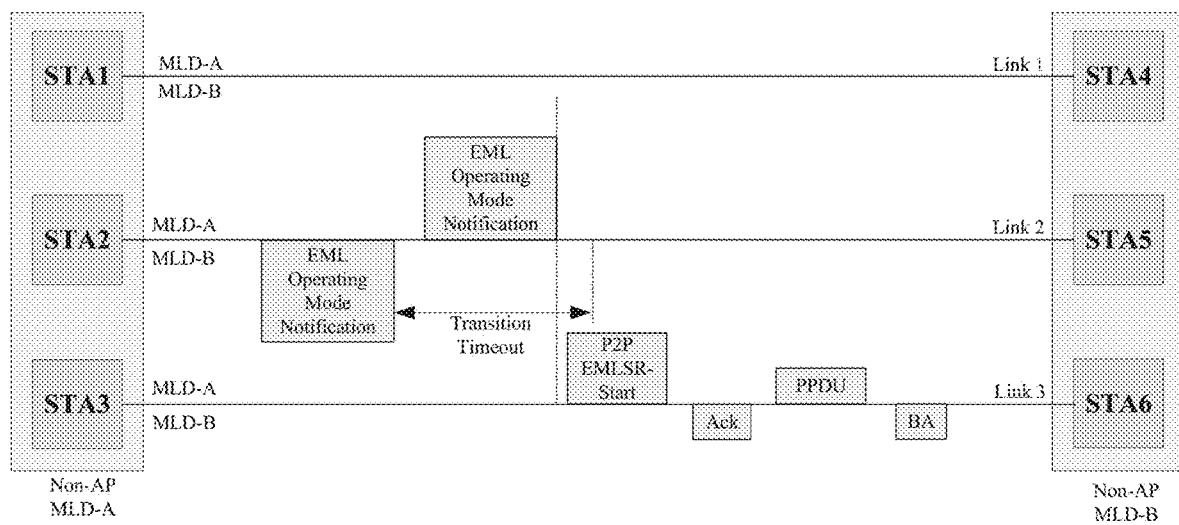
FIG. 8 illustrates an example of EMLSR link selection for a P2P EMLSR frame exchange using a P2P EMLSR-Start frame according to embodiments of the present disclosure.
FIG. 9 illustrates an example format of a P2P EMLSR Capabilities element including a Link Selecting MLD subfield according to embodiments of the present disclosure.

FIG. 8 illustrates an example of EMLSR link selection for a P2P EMLSR frame exchange using a P2P EMLSR-Start frame according to embodiments of the present disclosure. In the example of FIG. 8, there are two peer non-AP MLDs: non-AP MLD-A and non-AP MLD-B. STA1, STA2, and STA3 are three non-AP STAs affiliated with non-AP MLD-A. STA4, STA5, and STA6 are three non-AP STAs affiliated with non-AP MLD-B. STA1 and STA4 are associated with AP1 affiliated with an AP MLD, AP MLD-1 (not shown in the figure). STA2 and STA5 are associated with AP2 affiliated with AP MLD-1. STA3 and STA6 are associated with AP3 affiliated with AP MLD-1. There are three TDLS links (or other peer-to-peer links) set up between non-AP MLD-A and non-AP MLD-B: Link 1 between STA1 and STA4, Link 2 between STA2 and STA5, and Link 3 between STA3 and STA6. While operating over the TDLS peer-to-peer links, both non-AP MLD-A and non-AP MLD-B transition into EMLSR mode for P2P communication using any of the processes described herein above.

Once both of the peer non-AP MLDs are in EMLSR mode, STA3 sends a P2P EMLSR-Start frame to non-AP MLD-B over Link 3. This indicates the selection of Link 3 as the link for subsequent P2P EMLSR frame exchanges. Upon receiving the P2P EMLSR-Start frame, STA6 operating on Link 3 sends an Ack frame as a response to the P2P EMLSR-Start frame. Accordingly, P2P EMLSR frame exchanges take place over Link 3.

According to one embodiment, when there are multiple TDLS links (or other P2P links) set up between two non-AP MLDs that support EMLSR operation over the TDLS direct links, and when both peer non-AP MLDs have successfully transitioned into EMLSR mode for peer-to-peer communication, only one of the two peer non-AP MDs (e.g., the first non-AP MLD) can send the P2P EMLSR-Start frame to its peer non-AP MLD to indicate the link selected for EMLSR frame exchanges. According to one embodiment, which of the two peer non-AP MLDs is allowed to send the P2P EMLSR-Start frame as an indication for the link selected for EMLSR frame exchanges is based on the relative capabilities of the two peer non-AP MLDs. For example, if one non-AP MLD is STR capable and the other peer non-AP MLD is with NSTR constrained, then the non-AP MLD with STR capability will be the one that can send the P2P EMLSR-Start frame to indicate the link selected for EMLSR frame exchanges over the TDLS direct link.

According to another embodiment, when there are multiple TDLS links (or other P2P links) set up between two non-AP MLDs that support EMLSR operation over the TDLS direct links, and when both peer non-AP MLDs have successfully transitioned into EMLSR mode for peer-to-peer communication, which of the two non-AP MLDs can send the P2P EMLSR-Start frame as an indication for the link selected for EMLSR frame exchanges is indicated in the P2P EMLSR Capabilities elements that are exchanged between the two peer non-AP MLDs during the TDLS discovery and setup process. In order to accommodate this signaling the P2P EMLSR Capabilities element format may include an additional subfield for indicating which of the MLDs can select the link for P2P EMLSR frame exchanges.

FIG. 9 illustrates an example format of a P2P EMLSR Capabilities element including a Link Selecting MLD subfield according to embodiments of the present disclosure. In the example of FIG. 9, the definitions of the P2P EMLSR Support subfield, P2P EMLSR Padding Delay subfield, P2P EMLSR Transition Delay subfield, P2P Transition Timeout subfield, and EMLSR Initiating MLD subfield in the P2P EMLSR Capabilities element may be the same as the definitions of the corresponding subfields of FIG. 6.

The Link Selecting MLD subfield in the P2P EMLSR Capabilities element indicates whether or not the peer non-AP MLD transmitting the element intends to be the MLD that selects the link for P2P EMLSR frame exchanges. If the Link Selecting MLD subfield is set to 1 by the non-AP MLD that transmits the corresponding P2P EMLSR Capabilities element, it indicates that the non-AP MLD intends to be the EMLSR link selecting MLD. Otherwise, the transmitting non-AP MLD will not be the EMLSR link selecting MLD.

According to one embodiment, if the Link Selecting MLD subfield in the P2P EMLSR Capabilities element contained in a TDLS Discovery Request frame or TDLS Setup Request frame is set to 1, then the peer non-AP MLD for which the TDLS Discovery Request frame or TDLS Setup Request frame is intended should not also set the Link Selecting MLD subfield to 1 in the P2P EMLSR Capabilities element contained in the corresponding TDLS Discovery Response frame or TDLS Setup Response frame.

According to another embodiment, if the Link Selecting MLD subfield in the P2P EMLSR Capabilities element contained in a TDLS Discovery Request frame or TDLS Setup Request frame is set to 0, then the peer non-AP MLD for which the TDLS Discovery Request frame or TDLS Setup Request frame is intended should not also set the Link Selecting MLD subfield to 0 in the P2P EMLSR Capabilities element contained in the corresponding TDLS Discovery Response frame or TDLS Setup Response frame.

According to yet another embodiment, if the Link Selecting MLD subfield in the P2P EMLSR Capabilities element is set to the same value in the TDLS Discovery Request frame or TDLS Setup Request frame and in the corresponding TDLS Discovery Response frame or TDLS Setup Response frame, then it indicates that either of the two peer non-AP MLDs can be the EMLSR link selecting MLD. According to another embodiment, if the Link Selecting MLD subfield in the P2P EMLSR Capabilities element is set to the same value in the TDLS Discovery Request frame or TDLS Setup Request frame and in the corresponding TDLS Discovery Response frame or TDLS Setup Response frame, then the TDLS setup process is not successful—the TDLS respondent non-AP MLD will send the TDLS Setup Response frame to the TDLS initiator non-AP MLD with the Status Code not equal to SUCCESS, and the TDLS initiator non-AP MLD, upon receipt of the TDLS Setup Response frame with Status Code not equal to SUCCESS, will terminate the TDLS setup procedure and will discard the TDLS Setup Response frame.

According to one embodiment, when a non-AP MLD (e.g., the first non-AP MLD) has already transitioned into EMLSR mode for communication with its associated AP MLD, if the non-AP MLD then intends to establish a TDLS direct link (or any other P2P link) with another peer non-AP MLD (e.g., the second non-AP MLD) or a peer STA, then the STA affiliated with the first non-AP MLD and operating on the EMLSR link for frame exchanges with its associated AP affiliated with the AP MLD sends a TDLS Discovery Request frame to its associated AP as part of the EMLSR frame exchange sequence. Upon receipt of the TDLS Discovery Request frame, the AP MLD would then reroute the TDLS Discovery Request frame to the intended peer non-AP MLD (the second non-AP MLD) or the intended peer STA. Subsequent TDLS Setup Request frame and TDLS Setup response frame exchanges can occur over the TDLS direct link.

According to one embodiment, when a TDLS setup was successful and either of the two peer non-AP MLDs was in EMLSR mode with its associated AP MLD while negotiating the TDLS setup process, then upon tearing down the TDLS link the corresponding non-AP MLD will be in the EMLSR mode of operation with its associated AP MLD. According to another embodiment, upon tearing down the TDLS link the corresponding non-AP MLD will be considered to have exited the EMLSR mode of operation with its associated AP MLD, and will need to reinitiate the EMLSR transition procedure if the non-AP MLD intends to operate in EMLSR mode with its associated AP MLD.

According to one embodiment, for EMLSR operation between two peer non-AP MLDs over the peer-to-peer links, the EMLSR delay values (namely, P2P EMLSR Padding Delay, P2P EMLSR Transition Delay, and P2P Transition Timeout) that would be in effect for EMLSR operation between the two peer non-AP MLDs over the peer-to-peer links is the maximum of the two values in the delay sets corresponding to the two peer non-AP MLDs. For example, if two non-AP MLDs—non-AP MLD-A and non-AP MLD-B—have established TDLS direct links and intend to operate in EMLSR mode over the TDLS direct links, and if non-AP MLD-A has set the required padding delay for the P2P EMLSR-Start frame indicated in the P2P EMLSR Padding Delay subfield in a Basic Multi-Link element or P2P EMLSR Capabilities element as 16 us and non-AP MLD-B has set the corresponding padding delay value as 32 µs, then the minimum padding delay value for the P2P EMLSR-Start frame that would be in effect for EMLSR operation over the TDLS direct links between the two peer non-AP MLDs is 32 µs.

Figure 10:
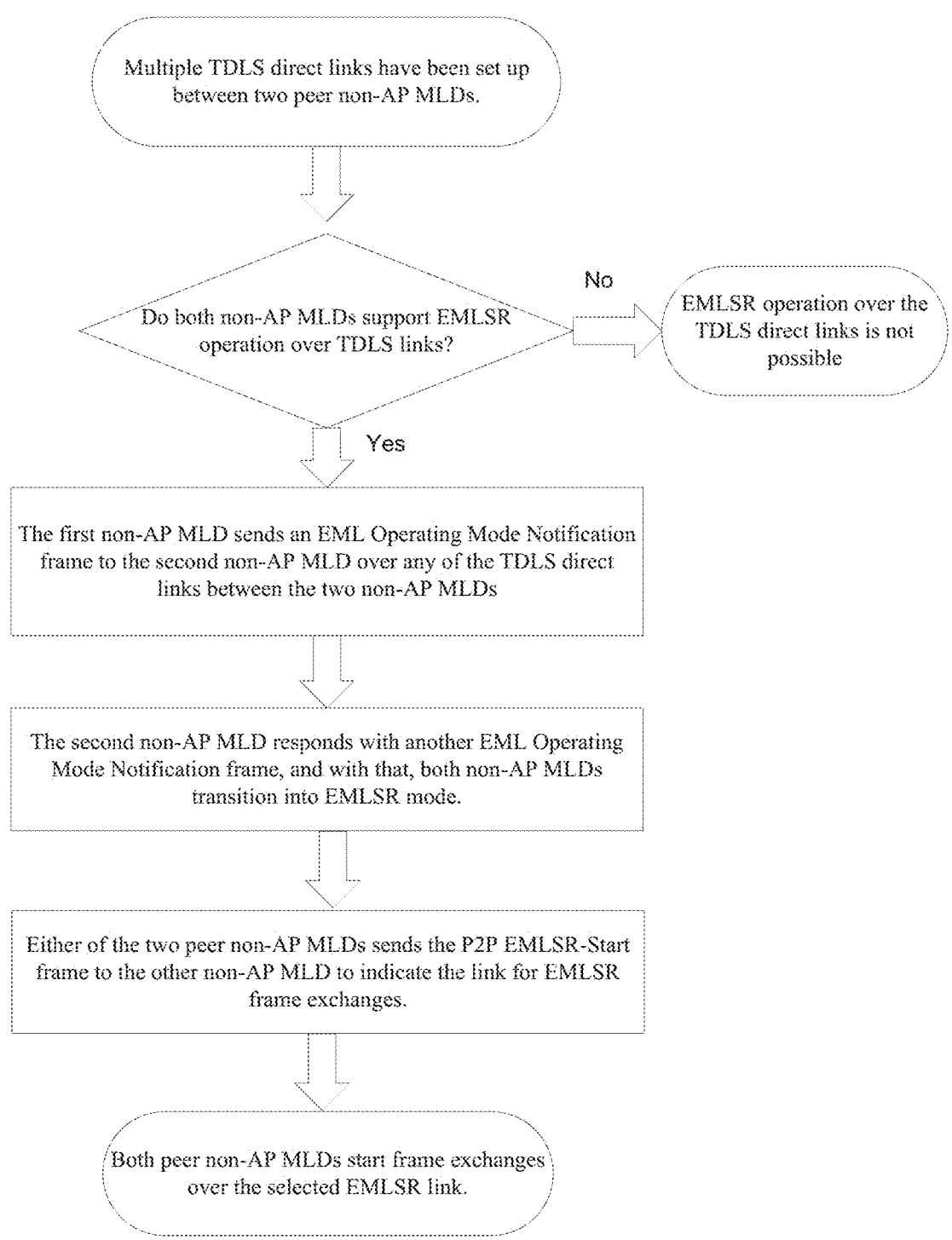
FIG. 10 illustrates an example process for EMLSR operation over TDLS direct links between two peer non-AP MLDs according to embodiments of the present disclosure.

FIG. 10 illustrates an example process for EMLSR operation over TDLS direct links between two peer non-AP MLDs according to embodiments of the present disclosure. The example process of FIG. 10 may be used with the various frame formats disclosed herein above.

Figure 11:
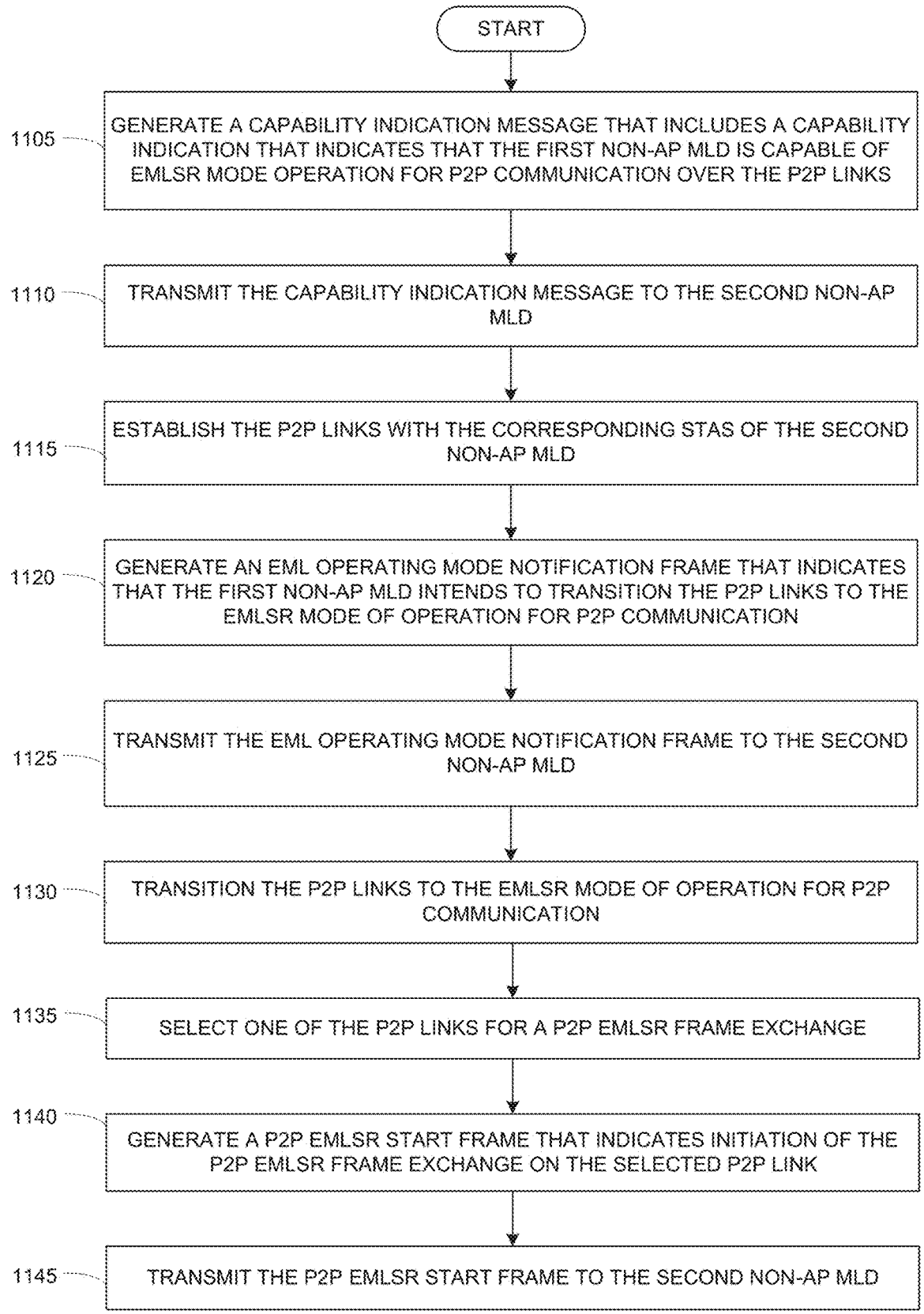
FIG. 11 illustrates an example process for facilitating the use of EMLSR operation for P2P communications between peer non-AP MLDs according to various embodiments of the present disclosure.

FIG. 11 illustrates an example process for facilitating the use of EMLSR operation for P2P communications between peer non-AP MLDs according to various embodiments of the present disclosure. The process of FIG. 11 is discussed as being performed by a first peer non-AP MLD, but it is understood that a corresponding second peer non-AP MLD performs a corresponding process. Additionally, for convenience the process of FIG. 11 is discussed as being performed by a WI-FI non-AP MLD comprising a plurality of first STAs that each comprise a transceiver configured to configured to form a P2P link with a corresponding second STA affiliated with a second WI-FI non-AP MLD, wherein the first non-AP MLD is capable of EMLSR mode operation for P2P communication over the P2P links. However, it is understood that any suitable wireless communication device could perform these processes.

Referring to FIG. 11, the process begins with the first non-AP MLD generating a capability indication message that includes a capability indication that indicates that the first non-AP MLD is capable of EMLSR mode operation for P2P communication over the P2P links (step 1105). Next, the first non-AP MLD transmits the capability indication message to the second non-AP MLD (step 1110).

In one embodiment of steps 1105 and 1110, the capability indication message may be a TDLS Discovery Response Action frame that contains a Multi-Link element that includes the capability indication, and the capability indication message is transmitted to the second non-AP MLD during a TDLS Discovery operation. In an alternative to this embodiment of steps 1105 and 1110, the capability indication message is a TDLS Discovery Response Action frame that contains a P2P EMLSR Capabilities element that includes the capability indication.

In one embodiment of steps 1105 and 1110, the capability indication message may be a TDLS Setup Request Action frame that contains a Multi-Link element that includes the capability indication, and the capability indication message is transmitted to the second non-AP MLD during a TDLS Setup operation. In an alternative to this embodiment of steps 1105 and 1110, the capability indication message is a TDLS Setup Request Action frame that contains a P2P EMLSR Capabilities element that includes the capability indication.

Next, the first non-AP MLD establishes P2P links between at least a subset of its transceivers and corresponding STAs of the second non-AP MLD (step 1115). The P2P links are established as EMLSR links configured to operate in the EMLSR mode of operation for P2P communication.

The first non-AP MLD then generates an EML Operating Mode Notification frame that indicates that the first non-AP MLD intends to transition the P2P links to the EMLSR mode of operation for P2P communication (step 1120), and transmits the EML Operating Mode Notification frame to the second non-AP MLD (step 1125).

The first non-AP MLD next transitions the P2P links to the EMLSR mode of operation for P2P communication (step 1130), after which it selects one of the P2P links for a P2P EMLSR frame exchange (step 1135).

Next, the first non-AP MLD generates a P2P EMLSR Start frame that indicates initiation of the P2P EMLSR frame exchange on the selected P2P link (step 1140). After this, the first non-AP MLD transmits the P2P EMLSR Start frame to the second non-AP MLD (step 1145).

The above flowchart illustrates an example method or process that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A first non-access point (AP) multi-link device (MLD), comprising:
   first stations (STAs), each comprising a transceiver configured to form a peer-to-peer (P2P) link with a corresponding second STA of a second non-AP MLD; and
   a processor operably coupled to the first STAs, the processor configured to generate a capability indication message that includes a capability indication that indicates that the first non-AP MLD is capable of an enhanced multi-link single radio (EMLSR) mode of operation for P2P communication over the P2P links,
   wherein at least one of the transceivers is further configured to transmit the capability indication message to the second non-AP MLD during a TDLS Discover operation or a TDLS Setup operation.

2. The first non-AP MLD of claim 1, wherein:
   the processor is further configured to generate the capability indication message as a Tunneled Direct Link Setup (TDLS) Discovery Response Action frame that contains a Multi-Link element that includes the capability indication, and
   at least one of the transceivers is further configured to transmit the capability indication message to the second non-AP MLD during the TDLS Discovery operation.

3. The first non-AP MLD of claim 1, wherein:
   the processor is further configured to generate the capability indication message as a TDLS Discovery Response Action frame that contains a P2P EMLSR Capabilities element that includes the capability indication, and at least one of the transceivers is further configured to transmit the capability indication message to the second non-AP MLD during the TDLS Discovery operation.

4. The first non-AP MLD of claim 1, wherein:
the processor is further configured to generate the capability indication message as a TDLS Setup Request Action frame that contains a Multi-Link element that includes the capability indication, and
at least one of the transceivers is further configured to transmit the capability indication message to the second non-AP MLD during the TDLS Setup operation.

5. The first non-AP MLD of claim 1, wherein:
the processor is further configured to generate the capability indication message as a TDLS Setup Request Action frame that contains a P2P EMLSR Capabilities element that includes the capability indication, and
at least one of the transceivers is further configured to transmit the capability indication message to the second non-AP MLD during the TDLS Setup operation.

6. The first non-AP MLD of claim 1, wherein:
at least a subset of the transceivers are further configured to establish the P2P links with the corresponding STAs of the second non-AP MLD,
the P2P links are EMLSR links configured to operate in the EMLSR mode of operation for P2P communication,
the processor is further configured to generate an EML Operating Mode Notification frame that indicates that the first non-AP MLD intends to transition the P2P links to the EMLSR mode of operation for P2P communication, and
at least one of the subset of the transceivers is further configured to transmit the EML Operating Mode Notification frame to the second non-AP MLD after the capability indication message has been transmitted.

7. The first non-AP MLD of claim 1, wherein:
at least a subset of the transceivers are further configured to establish the P2P links with the corresponding STAs of the second non-AP MLD,
the P2P links are EMLSR links configured to operate in the EMLSR mode of operation for P2P communication,
the processor is further configured to:
transition the P2P links to the EMLSR mode of operation for P2P communication;
after the P2P links are transitioned into the EMLSR mode of operation for P2P communication, select one of the P2P links for a P2P EMLSR frame exchange; and
generate a P2P EMLSR Start frame that indicates initiation of the P2P EMLSR frame exchange on the selected P2P link, and
at least one of the subset of the transceivers is further configured to transmit the P2P EMLSR Start frame to the second non-AP MLD.

8. A second non-access point (AP) multi-link device (MLD), comprising:
second stations (STAs), each comprising a transceiver configured to:
form a peer-to-peer (P2P) link with a corresponding first STA of a first non-AP MLD, and
receive a capability indication message from the first non-AP MLD during a Tunneled Direct Link Setup (TDLS) Discovery operation or a TDLS Setup operation; and
a processor operably coupled to the second STAs, the processor configured to determine that the capability indication message includes a capability indication that indicates that the first non-AP MLD is capable of an enhanced multi-link single radio (EMLSR) mode of operation for P2P communication over the P2P links.

9. The second non-AP MLD of claim 8, wherein:
at least one of the transceivers is further configured to receive the capability indication message from the first non-AP MLD during the TDLS Discovery operation, and
the capability indication message is a TDLS Discovery Response Action frame that contains a Multi-Link element that includes the capability indication.

10. The second non-AP MLD of claim 8, wherein:
at least one of the transceivers is further configured to receive the capability indication message from the first non-AP MLD during the TDLS Discovery operation, and
the capability indication message is a TDLS Discovery Response Action frame that contains a P2P EMLSR Capabilities element that includes the capability indication.

11. The second non-AP MLD of claim 8, wherein:
at least one of the transceivers is further configured to receive the capability indication message from the first non-AP MLD during the TDLS Setup operation, and
the capability indication message is a TDLS Setup Request Action frame that contains a Multi-Link element that includes the capability indication.

12. The second non-AP MLD of claim 8, wherein:
at least one of the transceivers is further configured to receive the capability indication message from the first non-AP MLD during the TDLS Setup operation, and
the capability indication message is a TDLS Setup Request Action frame that contains a P2P EMLSR Capabilities element that includes the capability indication.

13. The second non-AP MLD of claim 8, wherein:
at least a subset of the transceivers are further configured to establish the P2P links with the corresponding STAs of the first non-AP MLD,
the P2P links are EMLSR links configured to operate in the EMLSR mode of operation for P2P communication,
at least one of the subset of the transceivers is further configured to receive an EML Operating Mode Notification frame from the first non-AP MLD after the capability indication message has been received, and
the processor is further configured to determine that the EML Operating Mode Notification frame indicates that the first non-AP MLD intends to transition the P2P links to the EMLSR mode of operation for P2P communication.

14. The second non-AP MLD of claim 8, wherein:
at least a subset of the transceivers are further configured to establish the P2P links with the corresponding STAs of the first non-AP MLD,
the P2P links are EMLSR links configured to operate in the EMLSR mode of operation for P2P communication,
the processor is further configured to transition the P2P links to the EMLSR mode of operation for P2P communication,
at least one of the subset of the transceivers is further configured to receive a P2P EMLSR Start frame from the first non-AP MLD after the P2P links are transitioned into the EMLSR mode of operation for P2P communication, and
the processor is further configured to determine that the P2P EMLSR Start frame indicates initiation of a P2P EMLSR frame exchange on a selected P2P link.

15. A method of wireless communication performed by a first non-access point (AP) multi-link device (MLD) that comprises stations (STAs) that each comprise a transceiver configured to form a peer-to-peer (P2P) link with a corresponding second STA of a second non-AP MLD, the method comprising:
- generating a capability indication message that includes a capability indication that indicates that the first non-AP MLD is capable of an enhanced multi-link single radio (EMLSR) mode of operation for P2P communication over the P2P links; and
- transmitting the capability indication message to the second non-AP MLD during a TDLS Discover operation or a TDLS Setup operation.

16. The method of claim 15, further comprising:
- generating the capability indication message as a Tunneled Direct Link Setup (TDLS) Discovery Response Action frame that contains a Multi-Link element that includes the capability indication; and
- transmitting the capability indication message to the second non-AP MLD during the TDLS Discovery operation.

17. The method of claim 15, further comprising:
- generating the capability indication message as a TDLS Discovery Response Action frame that contains a P2P EMLSR Capabilities element that includes the capability indication; and
- transmitting the capability indication message to the second non-AP MLD during the TDLS Discovery operation.

18. The method of claim 15, further comprising:
- generating the capability indication message as a TDLS Setup Request Action frame that contains a Multi-Link element that includes the capability indication; and
- transmitting the capability indication message to the second non-AP MLD during the TDLS Setup operation.

19. The method of claim 15, further comprising:
- generating the capability indication message as a TDLS Setup Request Action frame that contains a P2P EMLSR Capabilities element that includes the capability indication; and
- transmitting the capability indication message to the second non-AP MLD during the TDLS Setup operation.

20. The method of claim 15, further comprising:
- establishing, by at least a subset of the transceivers, the P2P links with the corresponding STAs of the second non-AP MLD as EMLSR links configured to operate in the EMLSR mode of operation for P2P communication;
- generating an EML Operating Mode Notification frame that indicates that the first non-AP MLD intends to transition the P2P links to the EMLSR mode of operation for P2P communication; and
- transmitting the EML Operating Mode Notification frame to the second non-AP MLD after the capability indication message has been transmitted.

* * * * *